UNITED STATES PATENT OFFICE 2,075,035

PROCESS FOR PREPARING CARBOXYLIC ANHYDRIDES

George D. Graves, Wilmington, Del., assignor to E. I. du Pont de Nemours & Company, Wilmington, Del., a corporation of Delaware No Drawing. Application February 1, 1935, Serial No. 4,519

10 Claims. (Cl. 260—123)

This invention relates to the preparation of carboxylic acid anhydrides. It is an object of this invention to provide a new process for preparing carboxylic acid anhydrides, using materials which have not been known heretofore as suitable for the desired reaction. Other and further important objects of this invention will appear as the description proceeds.

Organic acid anhydrides have heretofore been prepared by various methods using as initial materials the acid, metal salts of the acids, or halides of the acids whose anhydrides are sought. In the case of aromatic acids, the corresponding acid trichlorides, such as benzotrichloride, have been suggested as initial materials. In these processes the acid trichloride is generally first hydrolyzed and then subjected to the action of an inorganic or organic dehydrating agent.

Interchange reactions have also been suggested, wherein higher acid anhydrides, for instance benzoic anhydride, are prepared by using the corresponding acids or metal salts thereof, and an anhydride of a lower acid, for instance acetic anhydride.

I have now found that anhydrides can be successfully obtained, in many cases in better yields and with greater economy, by reacting an ester of the acid whose anhydride is sought with an acid anhydride in the presence of a strong mineral acid or other ester interchange catalyst. For the synthesis of simple anhydrides the reaction is one of metathesis involving two mols of the ester with one mol. of the acid anhydride; in the case of monocarboxylic acid anhydrides the reaction is represented by the following equation:

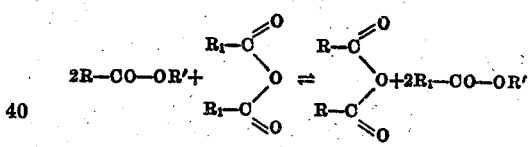

wherein R and R₁ represent alkyl or aryl radicals, and R¹ is an alkyl radical. Mixed anhydrides are obtained by using equimolar proportions of the ester and anhydride. Polycarboxylic acid anhydrides are obtained similarly by reacting a polycarboxylic acid ester with either a mono- or polycarboxylic acid anhydride.

It will be noted that the reaction is reversible, and may therefore be used to prepare either anhydride when an ester of the corresponding acid is available. But the greatest advantage from this invention will, of course, be derived when it is applied to the preparation of a complicated, relatively expensive anhydride by the aid of a simple and cheaper one.

My invention is also of particular advantage where the ester of a given carboxylic acid is more readily available than the free acid or a metal salt thereof; for instance, where the ester is a direct product or by-product from certain commercial operations.

My invention is of further advantage in preparing anhydrides whose corresponding acids are relatively unstable and cannot be isolated or maintained in pure form. An illustration in point is acetoacetic acid, which is less stable than its corresponding ethyl ester.

While a reversible reaction as a rule does not lead to 100% yields of the desired products, the rarity of the desired product or the lack of a more efficient method for its preparation will frequently justify its preparation by my novel method followed by a procedure of separation and recovery. Moreover, in many cases the yield of anhydride may be improved by using either an excess of the ester over the mol. proportions theoretically required for simple anhydride formation or by continuously displacing the reaction in the desired direction by removal of one of the reaction products. In many cases the operation may be arranged in a cyclic process whereby the unchanged initial material from a previous operation is used in a subsequent batch.

In the case of an ester whose anhydride is relatively more volatile, heat may be resorted to to distill the reaction product, thereby forcing a further conversion of the initial materials. Alternatively, the anhydride used as initial material may be so chosen that its ester will be more volatile than the remaining ingredients of the reaction mass.

These points and other details of operation are illustrated in the examples below, but it should be understood that these examples are given for the purpose of illustration only, and are not intended to limit my invention. Parts mentioned are by weight.

EXAMPLE I

Propionic anhydride

To a mixture of 220 parts of ethyl propionate and 112 parts of 95% acetic anhydride was added a solution of 29 parts of concentrated sulfuric acid in 17 parts glacial acetic acid. The solution was boiled under a fractionating column for 12 hours, during which time 135 parts of distillate was collected at the head of the column. The distillate came over at 75 to 79° C. and was identified as ethyl acetate. The residue in the flask contained propionic anhydride.

EXAMPLE II

*Butyric anhydride from propyl butyrate*

To a mixture of 195 parts of n-propyl butyrate and 84 parts of acetic anhydride was added a solution of 8 parts of concentrated sulfuric acid in 5 parts of glacial acetic acid. The solution was heated in an oil bath under a fractionating column at 160 to 180° C. for 21 hours, and 8 parts of concentrated sulfuric acid were added at the end of 5 and 13 hours' heating, respectively. A total of 104 parts of distillate was collected at the head of the column and identified as a mixture of n-propyl acetate and n-propyl butyrate. The product in the flask was identified as butyric anhydride.

EXAMPLE III

*Butyric anhydride from methyl butyrate and acetic anhydride*

To a mixture of 93 parts of methyl butyrate and 56 parts of acetic anhydride was added a solution of 16 parts of concentrated sulfuric acid in 4 parts of glacial acetic acid. This solution was heated at 150 to 170° C. under a fractionating column for 21 hours during which time 30 parts of distillate boiling at 45–57° C. was collected at the head of the column. The distillate was fractionated and identified as methyl acetate. The product in the flask was identified as butyric anhydride.

EXAMPLE IV

*Benzoic anhydride from ethyl benzoate and butyric anhydride*

To a mixture of 100 parts of butyric anhydride and 190 parts of ethyl benzoate were added 20 parts of p-toluene-sulfonic-acid-tetrahydrate, and the mixture was heated at 210–230° C. for 31 hours under a fractionating column, during which time 100 parts of distillate was collected at the head of the column. The distillate was identified as ethyl butyrate and corresponded to about 45% conversion. The residue in the flask contained benzoic anhydride.

In a similar manner, many other anhydrides may be prepared. For instance, valeric anhydride may be prepared by substituting for the methylbutyrate of Example III an equivalent quantity of propyl valerate.

Aliphatic esters of caproic, capric, toluic, acrylic, abietic, and numerous other aliphatic, aromatic, or hydroaromatic acids may likewise be used for the preparation of the respective anhydrides.

The details of procedure may vary from case to case. The physical properties of the initial and final materials such as melting points, boiling points, solubility in a given solvent, etc., may suggest in each particular case special conditions of operation whereby to obtain maximum yields or to facilitate recovery. Inert solvents may be employed, if desired, for instance benzene, toluene, chlorobenzene, high boiling gasolines, etc. This is particularly advantageous where the ester employed is solid.

The catalyst may vary both in nature and quantity. Strong, non-volatile acids are preferred, for instance sulfuric, p-toluene-sulfonic, camphor-sulfonic, or phosphoric. Salts, however, may also be used, especially zinc chloride, zinc sulfate, ferrous sulfate, ferric sulfate, stannic chloride, mercuric sulfate. Hydrogen chloride, litharge and other esterification catalysts are likewise useful. All these compounds form a natural group, and are recognized in the art as esterification or ester interchange catalysts.

The time required for the reaction varies with the temperature, but in general the temperature at which the mixture is heated should be sufficiently high to distill off the volatile ester formed in the course of the anhydride interchange. The time and temperature and the nature and amount of catalyst are interdependent factors which vary considerably with the nature of the reaction. The reactants are preferably employed in the ratio of two mols of the ester of the acid whose anhydride is desired to one mol. of a lower acid anhydride, but quantities outside this range are not precluded. If a mixed monocarboxylic acid anhydride is desired, the reactants are employed in substantially equimolar proportions.

In all these cases, however, the principle remains the same, and is based upon our discovery that an anhydride of one acid and an ester of another acid will generally react in the presence of a catalyst, by a reversible reaction, to give at least in part, the ester of the first acid and the anhydride of the second.

It will be understood, therefore, that my invention is not limited, except as defined by the following claims:

I claim:

1. The process of producing the anhydride of an organic carboxylic acid which comprises heating a mixture of an alkyl ester of said acid with the anhydride of a different carboxylic acid, in the presence of an esterification catalyst.

2. The process of producing the anhydride of an organic carboxylic acid which comprises refluxing a mixture comprising an aliphatic ester of said acid and the anhydride of a different carboxylic acid, and a strong acid.

3. The process of producing the anhydride of an organic carboxylic acid which comprises refluxing a mixture comprising an aliphatic ester of said acid and the anhydride of a different carboxylic acid, and a strong mineral acid.

4. The process of producing the anhydride of an organic carboxylic acid which comprises heating under a fractionating column a mixture comprising a high boiling ester of said acid and a high boiling anhydride of a different carboxylic acid in the presence of sulfuric acid.

5. The process of producing the anhydride of a carboxylic acid, which comprises heating under a fractionating column a mixture comprising an alkyl ester of said acid, the anhydride of a carboxylic acid of lower molecular weight, and sulfuric acid, and distilling off the ester of the second acid.

6. The process of producing the anhydride of an aliphatic carboxylic acid higher than acetic, which comprises heating under a fractionating column an alkyl ester of said acid and acetic anhydride in the presence of a catalytic quantity of concentrated sulfuric acid, continuing the operation until substantial quantities of the corresponding alkyl acetate have distilled over, and recovering the desired anhydride from the residue in the reaction mixture.

7. The process of producing the anhydride of an aromatic carboxylic acid, which comprises heating under a fractionating column an alkyl ester of said acid and an aliphatic anhydride in the presence of a catalytic quantity of concentrated sulfuric acid, continuing the operation until substantial quantities of the corresponding alkyl aliphatic ester have distilled over, and recovering the desired aromatic anhydride from the residue in the reaction mixture.

8. A process as in claim 7, the reagents being employed substantially in theoretically equivalent proportions.

9. A process as in claim 7, the reagents being employed in a proportion corresponding substantially to two mols of the ester for each mol. of the acid anhydride.

10. The process of producing the anhydride of an organic carboxylic acid which comprises reacting at temperatures between 150 and 230° C. in the liquid phase an alkyl ester of said acid with the anhydride of a different carboxylic acid in the presence of an ester interchange catalyst.

GEORGE D. GRAVES.